United States Patent
Merz

[11] Patent Number: 5,557,956
[45] Date of Patent: Sep. 24, 1996

[54] VISUAL AUTOMOTIVE THEFT DETERRENT DEVICE

[76] Inventor: Carl F. Merz, 725 Miller Ave., Freeport, N.Y. 11520

[21] Appl. No.: 394,286

[22] Filed: Feb. 24, 1995

[51] Int. Cl.$^6$ ................................................. B60R 25/02
[52] U.S. Cl. ..................... 70/209; 70/226; 70/DIG. 81; DIG. 8/339
[58] Field of Search ............................. 70/209, 226, 19, 70/DIG. 81, 237; 292/339; DIG. 8/330, 331, 339, 341

[56] References Cited

U.S. PATENT DOCUMENTS

| D. 306,252 | 2/1990 | Johnson | D8/331 |
|---|---|---|---|
| 3,613,410 | 10/1971 | Shaw | 70/DIG. 81 X |
| 4,036,518 | 7/1977 | Jost | 292/339 |
| 4,170,120 | 10/1979 | Feltman et al. | 70/DIG. 81 X |
| 5,107,692 | 4/1992 | Chen | 70/226 X |
| 5,174,138 | 12/1992 | Shen | 70/209 |
| 5,299,438 | 4/1994 | Chen | 70/209 |

FOREIGN PATENT DOCUMENTS

| 106779 | 3/1967 | Denmark | 70/238 |
|---|---|---|---|
| 489155 | 7/1938 | United Kingdom | 70/19 |

*Primary Examiner*—Lloyd A. Gall
*Attorney, Agent, or Firm*—Goldstein & Associates

[57] ABSTRACT

The invention is an automobile visual theft deterrent device, for use on an automobile having a steering wheel, comprising a tubular member, a middle housing, and an elongated rod member. The tubular member has a first wheel rim hook and the elongated rod member has a second wheel rim hook. The middle housing is attached to the tubular member. A central bore extends through the middle housing. The elongated rod member extending into the central bore for adjusting the relative distance between the first and second wheel rim hooks. The middle housing has an insert disk having a slot. The insert disk is silver colored to resemble a lock, but is not a functioning lock.

7 Claims, 1 Drawing Sheet

U.S. Patent    Sep. 24, 1996    5,557,956

VISUAL AUTOMOTIVE THEFT DETERRENT DEVICE

BACKGROUND OF THE INVENTION

The invention relates to a visual automotive theft deterrent system. More particularly, the invention relates to a device providing the appearance of a common functioning anti-theft device.

Automobile theft has drastically increased in recent years. Although once only a problem in major metropolitan areas, auto theft has become prevalent throughout the country, even in rural areas. Accordingly, numerous automotive anti-theft devices have been developed in an attempt at deterring or preventing automotive theft.

Auto alarms, due to their constant annoying false activation, are usually ignored, and thus do not provide meaningful deterrence. Furthermore, the electronic disablement aspects of such alarm systems, also known as "cut-off switches" are seldom effective. A skilled automobile thief can generally defeat even the most sophisticated of electronic disablement alarm systems in a matter of seconds.

Recently, devices that lock the steering wheel and brake pedal simultaneously have become extremely popular. Such devices link the steering wheel with the floor brake pedal, such that one attempting to operate the vehicle without authorization would be incapable of operating the vehicle due to the fact that neither the vehicle's steering capabilities nor its braking capabilities would be operable. These devices were quickly conquered by automobile thieves who would defeat them by cutting a small notch in the auto's steering wheel and simply removing the device.

To combat the lack of effectiveness inherent in these early devices, new devices were created which clamp onto the steering wheel and extend across the steering wheel, intersecting the center point and extending well beyond the sides of the steering wheel. When locked to the steering wheel, the device causes the steering wheel to be inoperable due to the fact that rotation of the steering wheel is limited as a result of the portions of the device which extend beyond the steering wheel and come into conflict with the automobile's doors, dashboard, and other interior fixtures.

Numerous U.S. Patents have focused on further developing this line of security devices in attempts to make these devices stronger and more foolproof. However, even though these devices are commonly constructed of heavy, sturdy steel, they are often easily defeated. Thieves quickly arrive at new techniques to be utilized in swiftly disabling these devices. Furthermore, as attempts to construct these devices of heavier and stronger metals to combat adept thieves has progressed, these devices have consequently become heavier, bulkier, cumbersome and more difficult to operate. Thus, people have become reluctant or unable to install these devices when they park their cars. If the device is not installed, it of course has absolutely no deterrence or preventative value. In addition, the need for a separately carried key to lock and unlock these devices often means that most individuals do not bother to lock the mechanism to the steering wheel. Accordingly, when it is attached to the steering wheel, it is providing no actual physical deterrence whatsoever.

What others have failed to recognize, however, is that the true deterrence in the steering wheel clamp line of devices is the visual deterrence which results when the device is installed upon an automobile steering wheel. In most instances, a thief who sees the device yet enters the vehicle anyway is likely to already know how to defeat the anti-theft device. Most professional and amateur thieves would not bother to enter a vehicle which is employing an anti-theft device which the thief knows he is unable to defeat. Thus, whether the device actually provides resistance to the thief is irrelevant. Therefore, the manufacturing cost in producing a functioning, intricate, locking steering wheel clamp device is wasted.

While these units may be suitable for the particular purpose employed, or for general use, they would not be as suitable for the purposes of the present invention as disclosed hereafter.

SUMMARY OF THE INVENTION

It is an object of the invention to produce an anti-theft device that aesthetically resembles an operative, locking device, in order to result in a visual deterrence to a would-be thief.

It is another object of the invention to provide an anti-theft device that is lightweight, and is thus inexpensive to manufacture and easy to transport and operate.

It is a further object of the invention to provide an anti-theft device having a sleeve with a retractable shaft that will adjust to a position where it is clamped within the steering wheel.

The invention is an automobile visual theft deterrent device, for use on an automobile having a steering wheel, comprising a tubular member, a middle housing, and an elongated rod member. The tubular member has a first wheel rim hook and the elongated rod member has a second wheel rim hook. The middle housing is attached to the tubular member. A central bore extends through the middle housing. The elongated rod member extends into the central bore for adjusting the relative distance between the first and second wheel rim hooks. The middle housing has an insert disk having a slot. The insert disk is silver colored to resemble a lock, but is not a functioning lock.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
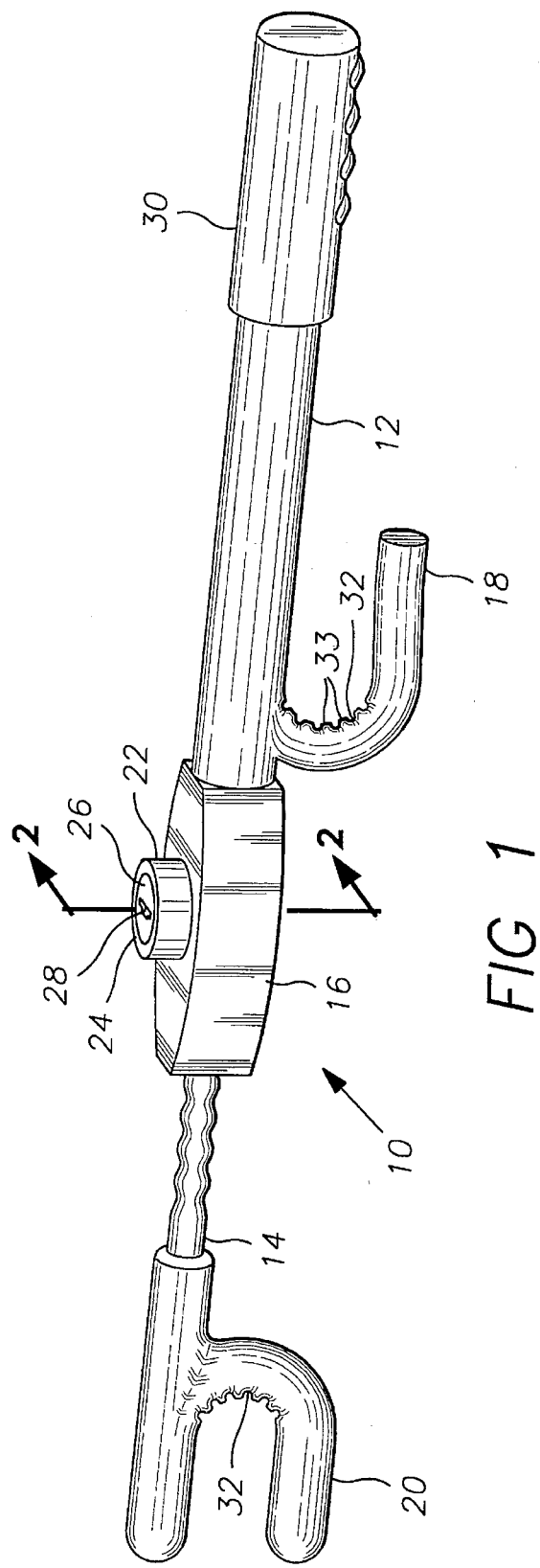
FIG. 1 is a diagrammatic perspective view of the instant invention per se.

FIG. 1 illustrates a visual automotive theft deterrent device 10 that may be installed on a steering wheel in an automobile. The deterrent device 10 has an elongated tubular member 12, an elongated rod member 14, and a middle housing 16. First and second wheel rim hooks 18 and 20, which engage opposed portions of the steering wheel from the inside thereof, are provided on the tubular member 12 and elongated rod member 14, respectively.

The middle housing 16 is attached to the tubular member 12. The middle housing 16 contains means for allowing the elongated rod member 14 to extend and retract. The middle housing 16 has a short cylinder 22 projecting from the middle housing 16. The short cylinder 22 has a top 24. An insert disk 26 is located at the top of the short cylinder 22. The insert disk 26 has a slot 28 that resembles a key hole. The insert disk 26 is made of silver colored plastic, so that it resembles a lock.

The elongated rod member 14 is terminated with the second wheel rim hook 20. The first wheel rim hook 18 is attached to the tubular member 12 near the middle housing 16. The tubular member 12 extends away from the middle housing 16, and extends a predetermined distance past the first wheel rim hook 18. The first wheel rim hook 18 and second wheel rim hook 20 are opposed, so that when the deterrent device 10 is installed within a steering wheel, the first wheel rim hook 18 and second wheel rim hook 20 engage opposed portions of the steering wheel from the inside. The predetermined distance is selected so that when the deterrent device is installed, the tubular member 12 provides the appearance that it would interfere with the proper steering of the automobile by hitting other objects within the automobile.

The tubular member 12 is terminated opposite the middle housing 16 with a grip cap 30, which extends over the tubular member 12. The first wheel rim hook 18 and second wheel rim hook 20 each have an inside semicircle 32, which has notches 33. The notches 33 normally are in contact with the steering wheel when the deterrent device 10 is installed on the steering wheel.

Figure 2:
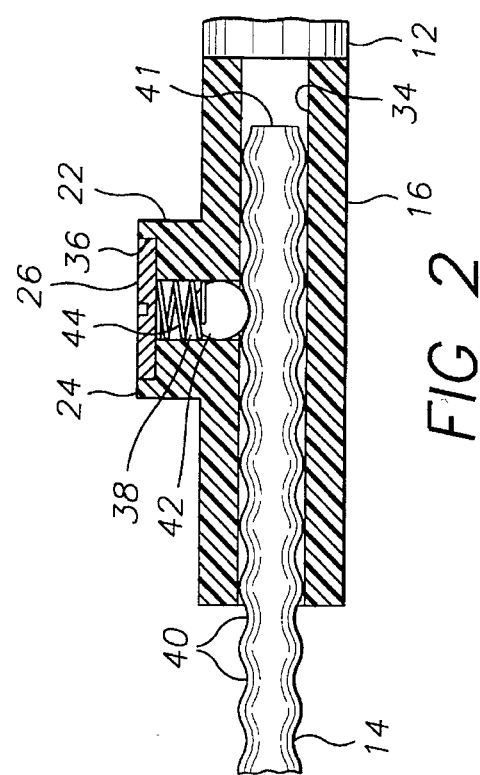
FIG. 2 is an elevational view with parts broken away, illustrating some internal detail of the instant invention.

FIG. 2 illustrates the deterrent device 10 with parts broken away. The middle housing 16 has a central bore 34 which extends fully through the middle housing 16 and extends into the tubular member 12. The short cylinder 22 has an insert disk cavity 36 extending from the top 24 of the short cylinder 22, wherein the insert disk 26 is located. A bearing cavity 38 extends from the insert disk cavity 36 to the central bore 34, transverse to the central bore 34. The elongated rod member 14 has annular grooves 40. The elongated rod member 14 has a flat end 41 opposite the second wheel rim hook 20. The flat end 41 moves into and out of the central bore 34 to adjust the relative distance between the first wheel rim hook 18 and second wheel rim hook 20. A bearing 42 is located within the bearing cavity 38 to engage the annular grooves 40 on the elongated rod member 14. The bearing 42 is biased against the elongated rod member 14 with a spring 44 which extends in the bearing cavity 38 between the bearing 42 and the insert disk. The bearing 42 moves up and down within the bearing cavity 38, following the annular grooves 40, as the elongated rod member 14 is inserted and withdrawn from the central bore 34.

Referring to FIG. 1 and FIG. 2, advantageously, the tubular member 12, middle housing 16 and elongated rod member 14 are constructed of lightweight plastic. These parts may be produced of lightweight, inexpensive plastic, because it is not intended that they offer any real resistance to a would-be auto thief. What is intended, is that they give the appearance of a fully operational and locking anti-theft device, so that the would-be thief is deterred from entering the automobile. Thus the plastic may be of a grade that does not offer any substantial resistance to a person of ordinary strength. Further, the elongated rod member 14 should be constructed of silver or metallic colored plastic, so that it gives the appearance of metal.

The insert disk 26 may be made in the same mold as the elongated rod member 14. When the deterrent device is assembled, the insert disk 26 is separated from the elongated rod member 14, and is inserted into the middle housing 16 in the insert disk cavity 36. In addition, the elongated rod member 14 may be dipped in colored plastic to color the red, black, or some color other than silver, to give the deterrent device 10 a more generic look.

In conclusion, herein is presented a visual automotive theft deterrent device that prevents automotive theft by giving the appearance of an actual locking device.

What is claimed is:

1. An automobile visual theft deterrent device to simulate a locking device for use on an automobile having a steering wheel, comprising:

a tubular member, having a first wheel rim hook;

a middle housing, the middle housing attached to the tubular member, the middle housing having a central bore extending through the middle housing, the middle housing having an insert disk cavity, and an insert disk mounted in the insert disk cavity, the insert disk having a slot that resembles a key hole, the insert disk is silver colored to resemble a lock; and an elongated rod member, having a second wheel rim hook and a flat end, the second wheel rim hook is opposite the first wheel rim hook, the flat end extends into the central bore to adjust the relative distance between the first wheel rim hook and second wheel rim hook, the first wheel rim hook and second wheel rim hook are opposed to one another so that they may engage opposed portions of the steering wheel from the inside thereof, wherein the tubular member and the elongated rod member are constructed of lightweight plastic, the slot and insert disk defining a means which is not capable of receiving a key to unlock the rod member relative to the middle housing through actuation of the key.

2. The automobile visual theft deterrent device as recited in claim 1, wherein the elongated rod member has a plurality of annular grooves, and the middle housing further comprises:

a bearing cavity extending between the insert disk cavity and the central bore, a bearing within the bearing cavity, and a spring biasing the bearing against the elongated rod member extending in the central bore.

3. The automobile visual theft deterrent device as recited in claim 2, wherein the first wheel rim hook and second wheel rim hook each have an inside semicircle which has notches, the notches normally are in contact with the steering wheel when the device is installed on the steering wheel.

4. The automobile visual theft deterrent device as recited in claim 3, wherein a short cylinder projects from the middle housing, the short cylinder having a top where the insert disk is located.

5. The automobile visual theft deterrent device as recited in claim 4, wherein the tubular member extends from the middle housing, extending past the first wheel rim hook for a predetermined distance, the predetermined distance is such that when the device is installed on the steering wheel, the tubular member gives the appearance that it would interfere with proper steering of the steering wheel.

6. The automobile visual theft deterrent device as recited in claim 5, further comprising a grip cap, mounted on the tubular member.

7. The automobile visual theft deterrent device as recited in claim 1, wherein the lightweight plastic will not provide substantial resistance to a person wishing to remove the device from the steering wheel.

\* \* \* \* \*